United States Patent

Witt

[15] 3,653,488

[45] Apr. 4, 1972

[54] TROLLEY CONVEYOR SYSTEM AND DISPATCH STATION

[72] Inventor: George L. Witt, Oxford, Mich.

[73] Assignee: My-T-Veyor Corporation, Oxford, Mich.

[22] Filed: Nov. 23, 1970

[21] Appl. No.: 91,838

[52] U.S. Cl. ............................................. 198/38, 198/177
[51] Int. Cl. ........................................................ B65g 17/20
[58] Field of Search .................. 198/38, 177; 104/88; 214/60

[56] References Cited

UNITED STATES PATENTS 3,282,400  11/1966  Johnson .................................... 198/38

3,402,675  9/1968  Witt .......................................... 104/88

Primary Examiner—Robert G. Sheridan
Attorney—Cullen, Settle, Sloman & Cantor

[57] ABSTRACT

A trolley conveyor system which includes an elongated trackway and a plurality of longitudinally spaced trolley conveyors movably mounted thereon, and which includes a dumping system by which hangers removably mounted upon a plurality of pendent plates suspended from the trolley conveyors are automatically disengaged from the pendent plates as the corresponding trolley conveyors by which the plates are suspended move through the dumping station to effect an automatic unload.

5 Claims, 5 Drawing Figures

Patented April 4, 1972

INVENTOR
GEORGE L. WITT

BY Cullen, Settle, Sloman & Cantor

ATTORNEYS

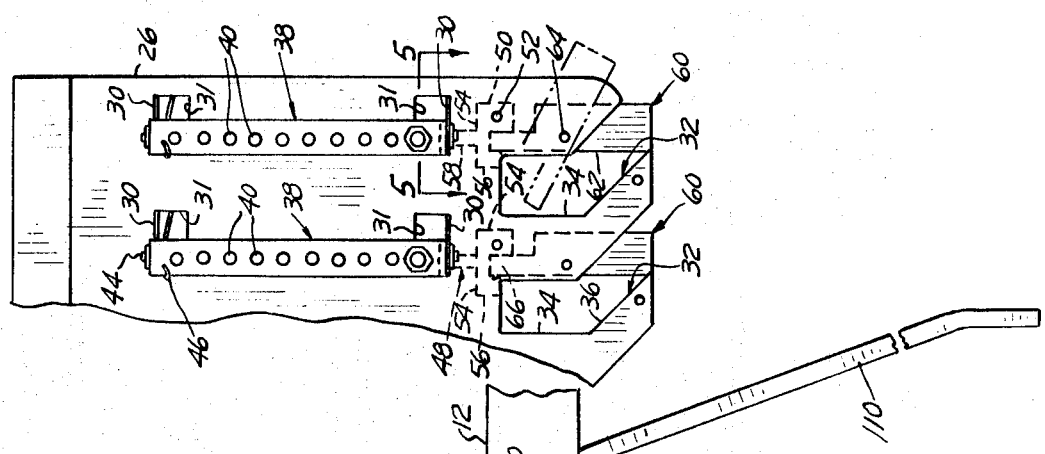
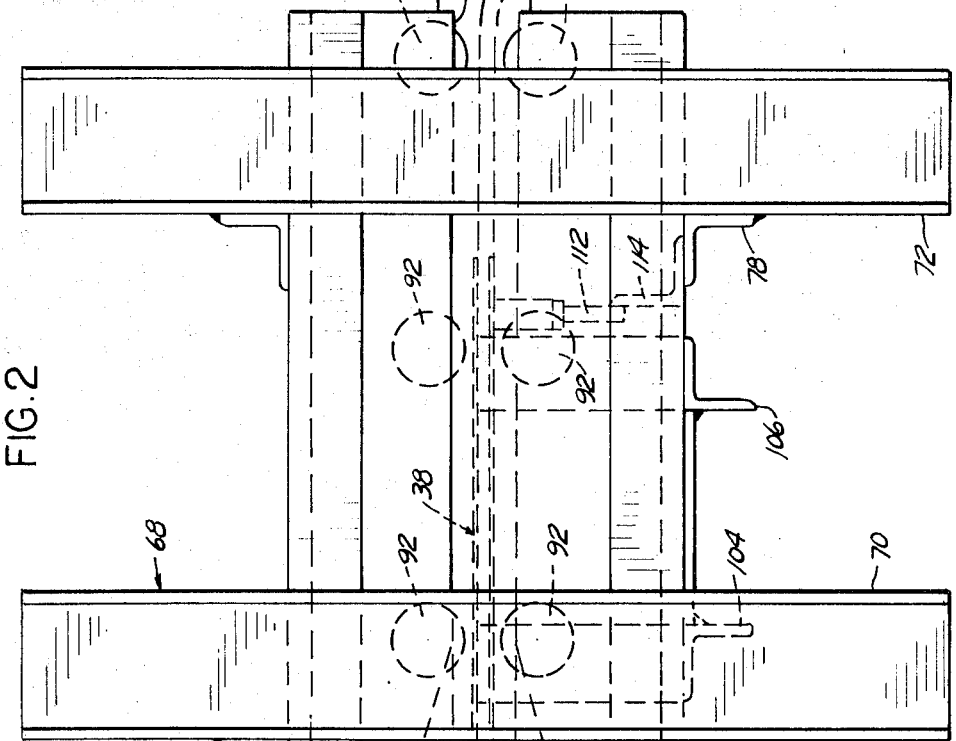
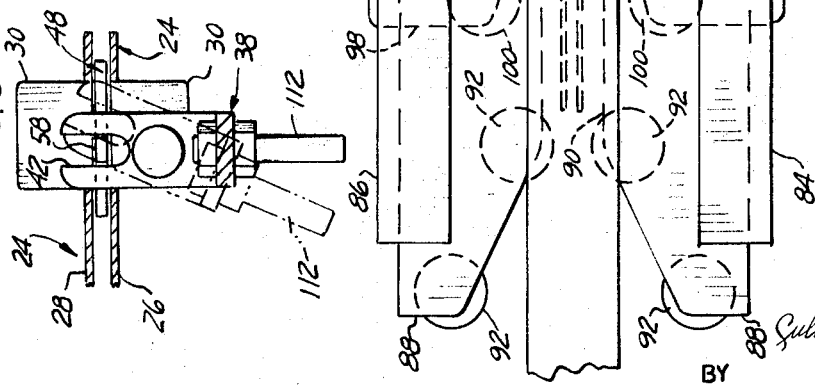
INVENTOR
GEORGE L. WITT
BY *Cullen, Settle, Sloman & Cantor*
ATTORNEYS

TROLLEY CONVEYOR SYSTEM AND DISPATCH STATION

BACKGROUND OF THE INVENTION

1. Field of the Invention

This invention relates to a trolley conveyor system which includes a dumping system by which hangars or other objects removably mounted on a plurality of pendent plates suspended from trolley conveyors riding on an elongated trackway are automatically disengaged from the pendent plates as the corresponding trolley conveyors move through the dumping station to effect an automatic unload.

2. The Prior Art

Trolley conveyor systems of various types are known in the prior art. One such system is described in U.S. Pat. No. 3,402,675. In this system, individual pendents are suspended from trolleys riding on an elongated trackway. As the individual pendents pass through the dumping station, they are tilted and hangers or other objects being carried by the pendents are automatically removed.

The present invention provides a multiple selector dispatch carrier whereby preselected hangers or other objects are automatically dumped from the conveyor system.

It is an object of this invention to provide trolley conveyor system having a dumping system by which hangers removably mounted on a plurality of pendent plates suspended from the conveyors are automatically disengaged from the pendent plates as the corresponding trolley conveyors by which the plates are suspended move through the dumping station to effect an automatic unload.

It is a further object of the present invention to provide an unloading station or dumping station which incorporates the framework of the conveyor system and which movably receives the respective trolley conveyors carrying the load mounting pendent plates which move through the said framework and incorporating tripping means associated with the pendent plates and preselected and prelocated stop pins and stop between the tripping means and the portion of the frame to effect disengagement of the load or hanger means from the lower end of the pendent plates.

These and other objects of the invention will be seen from the following specification and claims in conjunction with the appended drawings, in which:

FIG. 2 is a top view of the trolley conveyor system of the invention incorporating the present dumping station;

FIG. 4 is an enlarged side elevational view with parts broken away and parts in phantom of the pendent carrier assembly forming a part of the trolley conveyor system and dumping station of the invention;

FIG. 5 is an enlarged view through line 5—5 of FIG. 4 of the trip bracket attached to the pendent carrier plate forming a part of the apparatus of the invention.

DESCRIPTION OF THE PREFERRED EMBODIMENTS

Figure 1:
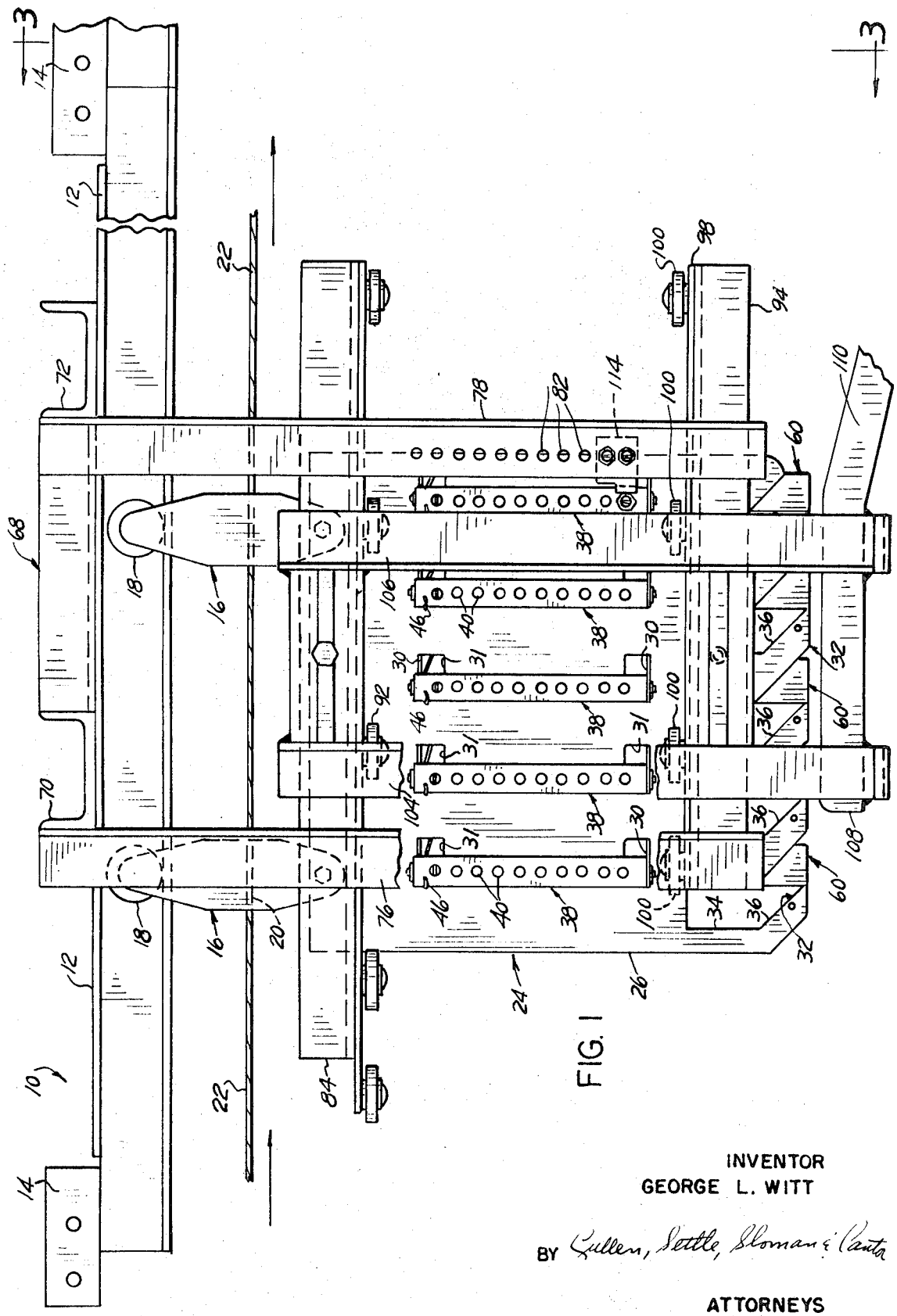
FIG. 1 is a fragmentary, side elevational view of the trolley conveyor system of the invention incorporating the present dumping station.

Referring to the drawings, a portion of a trolley conveyor system incorporating the dumping station of the present invention is shown in FIG. 1 and indicated generally at 10. As shown in FIG. 1, the conveyor system of the instant invention comprises an upper horizontally extending I-beam trackway 12 having a tab 14 at each end to which can be attached adjacent track portions. The tabs 14 are offset relative to the center line of the trackway 12 in order that adjacent sections of the trackway 12 can be properly and smoothly aligned. A series of longitudinally spaced trolley conveyors 16 are mounted on the trackway 12. Each conveyor 16 includes spaced supporting rollers 18 mounted on the trackway 12. Each trolley conveyor 16 also includes intermediate its upper and lower ends, aperture means to provide an interlock as at 20 between a power driven cable 22 or series of cable sections. These cable sections normally have upset or enlarged pin portions which are brought into registry with an individual trolley conveyor 16 and in the assembly of a conveyor element are interconnected therewith whereby when driving power is transmitted to the cable element, the trolley conveyors 16 are caused to move over the trackway of a trolley conveyor system and on to the corresponding I-beam or track 12, which forms a part of the present dumping station.

A pendent carrier assembly 24 is suspended between an adjacent pair of trolley conveyors 16. The pendent carrier assembly 24 comprises a pair of opposed parallel plates 26 and 28 spaced apart from each other. The plates 26 and 28 are of generally rectangular shape and each has two rows of longitudinally extending outwardly horizontally projecting tabs 30 which are parallel to each other. The tabs 30 are struck from the respective plates 26 and 28, forming apertures 31. At the bottom of each of the plates is a plurality of slots 32. Each slot comprises a substantially rectangular upper portion 34 and a trapezoidal lower portion 36 which communicates with the upper portion. The lower portion 36 extends at an angle relative to the upper portion 34 and opens into the bottom of the plate. A trip bracket 38 is mounted between vertically aligned upper and lower tabs 30. The trip bracket is [-shaped in cross-section and has a plurality of uniform orifices 40 extending the length of the web portion of the [. The lower leg of the trip bracket has a slot 42 in the outer end thereof. The trip bracket 38 is attached to the tabs 30 by means of rivets 44. The trip bracket 38 is spring biased in an outwardly extending position by means of a spring 46 located around the rivet 44 connecting the upper leg of the trip bracket 38 with the upper tab 30 and biased against the trip bracket 38 and against the inside of the plate 26 or 28.

A release lever 48 is pivotably mounted between the opposed parallel plates 26 and 28 below each of the lower tabs 30 in the area between the upper portions of the slots 32. The release lever 48 comprises a rectangular base portion 50 having an orifice 52 therein by which the release lever is mounted, a horizontal rectangular portion 54 and a downwardly depending rectangular portion 56 attached to the end of the horizontal portion 54 opposite from the base portion. A vertical extension 58 projects upwardly from the middle of the horizontal portion of the release lever 48. The vertical extension 58 fits within the slot in the lower leg of the trip bracket 38 when the release lever 48 is mounted between the plates 26 and 28.

A dispatch lever 60 is pivotably mounted for engagement with each release lever 48. The dispatch lever 60 is pivotably mounted between the opposed plates 26 and 28 by means of a rivet between the plates, in the web portion of the plates between each of the slots 32, the lever 60 being mounted along a line adjacent to the junction of the upper 34 and lower 36 portions of each slot 32. The dispatch lever 60 comprises a lower rectangular base portion 62 having an orifice 64 by which the lever 60 is mounted between the plates 26 and 28, and has an upwardly projecting tab portion 66 extending from one side of the top of the base portion 62. When in normal position, the tab portion 66 is received within the recess formed by the base portion 50 and downwardly extending portion 56 of the release lever 48. The base 62 of the dispatch lever 60, when the lever 60 is in position, extends downwardly and has a corner extending between opposed corner sections of the web portions of the opposed plates 28 and 32, thereby closing off the slots 32 to any objects being carried transversely within the slot 32. Rotational movement of the trip bracket 38 to the left as seen in FIG. 5, causes rotational movement of the release lever 48 in opposite direction which in turn causes the dispatch lever 60 to rotatably move in a counter-clockwise direction. When the dispatch lever 60 is rotated, it unblocks the slot 32 allowing anything contained within the slot 32 to fall out of the slot 32.

When an object is being reinserted within the slot, pressure on the tab 66 of the dispatch lever 60 causes it to rotate in a clockwise direction, seating itself within the recess in the release lever 48, thus placing the dispatch lever 60 in its original position and again blocking the slot 32 which it extends through.

The dumping station includes an open framework 68 which has a pair of longitudinally spaced horizontally disposed transverse channels 70 and 72 which span the I-beam forming track 12. A cross channel 74 joins each transverse channel 70 and 72, one on each side of the track 12. On each side of the track 12, a pair of opposed parallel channels 76 and 78 extend downwardly from the transverse channels 70 and 72, one being mounted on each of a transverse channel 70 and 72, respectively. A supporting channel 80 extends between the end of each transverse channel 70 or 72 and a point on the downwardly depending channel 76 or 78 near the bottom thereof. The downwardly depending channels 76 and 78 and supporting channels 80 are conventionally made of angle iron. As best seen in FIG. 1, the right-hand channel 78 on the opposed sides of the I-beam track 12 has a plurality of orifices 82 extending vertically along the channel.

A pair of opposed L-shaped channels 84 and 86 are mounted on the inside of each of the sets of parallel channels 76 and 78 spanning them. A longitudinally extending plate 88 is mounted on the horizontal leg of each channel 84 and 86. The opposed longitudinally extending plates 88 are parallel aligned forming a slot 90 therebetween through which the pendent carrier assembly 24 can pass. As best seen in FIG. 2, the left-hand end of the plates 88 slant outwardly forming a receiving mouth for the pendent carrier assembly sections 24 as they approach the dumping station. The plates 88 have a plurality of rollers 92 mounted horizontally near the inner edges of the plates 88. The diameter of the rollers 92 is such that their outer periphery extend beyond the inner edges of the plates 88 so that the rollers 92 act as guides for the pendent carrier assembly as it is traveling through the slot 90 between the opposed plates 88.

A pair of lower angles 94 and 96 is mounted on the inner side of each of the pairs of downwardly extending channels 76 and 77. These angles are identical to the upper angles 84 and 86 except that they do not extend beyond the left-hand edge of the downwardly extending angles 76 and 78. The lower angles 94 and 96 each have longitudinally extending rectangular plates 98 mounted on the top sides thereof and have wheels 100 mounted along the inner edges to assist in guiding the pendent carrier assembly 24 through the slot 102 formed by the inner edges of the opposed plates 98. The lower plates 98 have their inner edges beveled outwardly at the left end thereof as seen in FIG. 2, thereby forming a mouth for receiving the assembly 24 as it passes through the dumping station from left to right.

A pair of parallel vertically situated angles 104 and 106 are mounted on the outside of angles 76 and 78 on one side of the track 12, extending downwardly beyond angle 94. A U-shaped channel 108 is mounted between the lower ends of the parallel angles 104 and 106. A rail 110 is mounted on the inner leg of the U-shaped channel 108 and extends downwardly and outwardly relative to the conveyor system. The rail 110 is positioned so that hangers or other unit dropping out of the slots 32 in the pendent carrier assembly 24 drops onto the rail 110 and is then conveyed to a receiving station.

Figure 3:
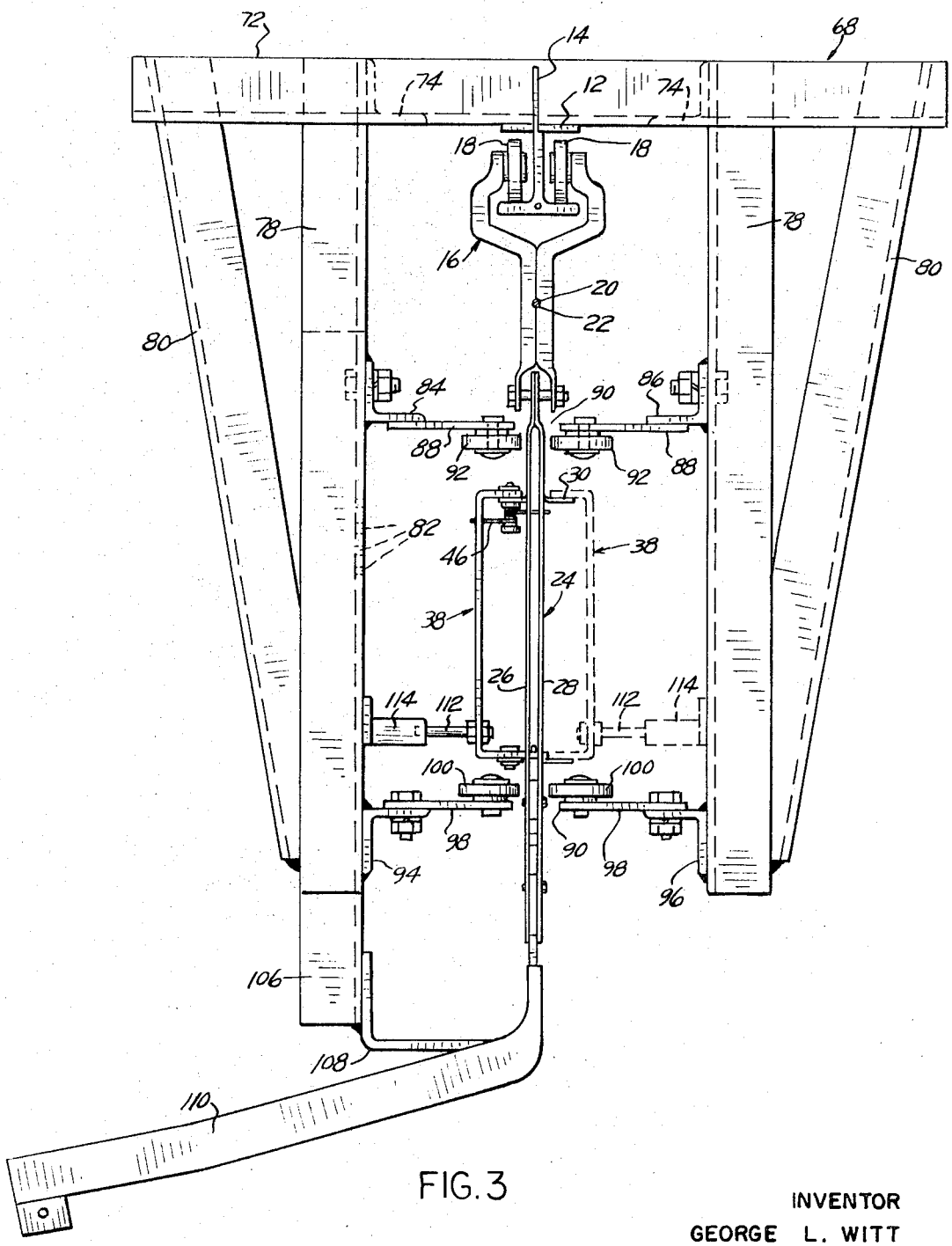
FIG. 3 is an end view taken in the direction of arrows 3—3 of FIG. 1.

A trip pin 112 is mounted in one of the orifices in each trip bracket 38. The trip pin 112 extends horizontally outwardly from the bracket 38. A trip bar 114 is mounted on the interior of a right-hand angle 78 as seen in FIG. 3 by means of a bolt extending through the bar and through one of the orifices 82 in the angle 78. As the assembly 24 passes through the dumping station, the trip pin 112 engages the trip bar 114 causing the release and dispatch levers 48 and 60, respectively, to be tripped in the manner heretofore described, thus releasing the hanger and other objects being carried within the slot 32. The hanger or other object then falls downwardly onto the rail 110 and then slides down the rail to a receiving station, not shown.

As can readily be appreciated, any number of dumping stations can be used on any one conveyor system simply by alternative positioning of the trip pin 112 within the orifices in the trip bracket 38 and positioning of the trip bar 114 by means of the orifices 82 in the angle 78.

Once the trip pin 112 clears the trip bar 114, the trip bracket 38 then returns to its original position. However, the dispatch lever 60 is not returned to its original position until actuated either by hand or by a hanger being inserted in the slot and brought to bear against the upwardly extending tab 66. The top of the tab then impinges against the downwardly extending tab portion of the release lever 48 causing it to rotate and in turn causing the trip bracket 38 to rotate slightly until the upwardly extending tab 66 clears the downwardly extending tab 56 of the release lever 48 and seats in the recess between the downwardly extending tab 56 of the release lever and the base portion 50 of the release lever 48.

It is seen that the respective carrier assemblies 24 for each pair of trolley conveyors, by virtue of the double pair of rollers 92 and 100, are guided through the entire length of the dump station and thus keep the trip bracket 38 guided within close tolerance for accurate and positive action.

Employing a series of unloading or dumping stations within the trolley conveyor system, the respective pins 112 corresponding to each trip bracket 38 and slot 32 can be preset as can be the trip bars 114 for a particular station, so that garments or other objects carried by the system can be unloaded automatically in predetermined areas.

While the trackway has been shown horizontal, it is contemplated that the same could be at any desired inclination consistent with the present disclosure.

What is claimed is:

1. In a trolley conveyor system including an elongated trackway and a plurality of longitudinally spaced trolley conveyors movably mounted thereon; a dumping station in said system comprising a frame, opposed guide means on said frame defining a slot therebetween, a carrier assembly suspended from each pair of adjacent trolley conveyors guidably extending loosely in said slot between said guide means, said carrier assembly comprising a pair of parallel mounted substantially rectangular plates in side view having on at least one side thereof a first row of longitudinally aligned outwardly horizontally extending tabs, a second parallel row of longitudinally aligned outwardly horizontally extending tabs, slot means along the bottom edge of said assembly for receiving a hanger or other objects, trip means pivotably mounted between vertically aligned tabs, a tripping mechanism mounted on said assembly having means engageable with said trip means to block the openings in said slots when said trip means is in a normal position, a stop mounted on said frame for selectively tripping one of said trip means when said trip means passes past said stop, whereby when said trip means is engaged said trip mechanism unblocks one of the openings of said slots to release a hanger or other object confined within therefrom, and means mounted on said frame for receiving a released hanger and conveying it to a receiving station.

2. In a trolley conveyor system including an elongated trackway and a plurality of longitudinally spaced trolley conveyors movably mounted thereon; a dumping station in said system comprising a frame, a first pair of opposed spaced guide tracks extending longitudinally through said frame spaced below said trackway; a second pair of opposed spaced guide tracks extending longitudinally through said frame spaced below said first pair of guide tracks and vertically aligned therewith, a carrier assembly suspended from each pair of adjacent trolley conveyors guidably extending loosely between said guide tracks, said guide tracks having rollers mounted adjacent the inner edges thereof defining a slot through which said carrier assembly travels, said carrier assembly comprising a pair of parallel mounted substantially rectangular plates in side view having on at least one side thereof a first row of longitudinally aligned outwardly horizontally extending tabs, a second parallel row of longitudinally aligned outwardly horizontally extending tabs, slot means along the bottom edge of said plates for receiving a hanger or other objects, trip means pivotably mounted between vertically aligned tabs, a tripping mechanism mounted on said assembly having means engageable with said trip means to block the openings in said slots when said trip means is in a normal position, a stop mounted on said frame for selectively tripping one of said trip means when said trip means passes past said stop, whereby when said trip means is engaged said trip mechanism unblocks one of the openings of said slots to release a hanger or other object confined within therefrom, and means mounted on said frame for receiving a released hanger and conveying it to a receiving station.

3. In the dumping station of a trolley conveyor system defined in claim 2, a means on said trip means limiting its pivotal movements, and returning it to substantially its original position after having been tripped.

4. In the dumping station of a trolley conveyor system of claim 2, said guide tracks diverging laterally to guide said carrier assembly into the said guide tracks.

5. In a trolley conveyor system including an elongated trackway and a plurality of longitudinally spaced conveyors movably mounted thereon;

a pendent carrier assembly suspended from at least one of said trolley conveyors, said carrier assembly comprising a pair of spaced apart parallel plates, substantially rectangular in side view, defining a space therebetween, each of said plates having a first longitudinally extending row of outwardly projecting horizontal tabs, a second longitudinally extending row of outwardly projecting horizontal tabs situated parallel to said first row, a plurality of forward facing elbow-shaped slots along the bottom of said plate, a C-shaped trip bracket mounted between vertically aligned tabs of said first and second rows, said trip bracket having a plurality of orifices vertically aligned in the bight of said bracket, the lower leg of said C-shaped bracket having a slot in the end thereof adapted to receive a lever, means adjacent the connection between the upper end of said bracket and said upper tab for biasing said bracket in normal position, a lever mechanism mounted between said plates engage in said slot of said bracket, normally blocking off the slot formed by the opposed plates and each of said slots in each of said plates, and movable from a first blocking position to a second unblocking position in response to movement of said bracket.

* * * * *